United States Patent [19]

Harding et al.

[11] 4,095,731

[45] Jun. 20, 1978

[54] GUIDING NARROW STRIP

[75] Inventors: Antony Harding, Schieren, Luxembourg; Michel Lemaire, Arlon, Belgium

[73] Assignee: The Goodyear Tire & Rubber Company, Akron, Ohio

[21] Appl. No.: 765,576

[22] Filed: Feb. 4, 1977

[51] Int. Cl.² .......................................... B29H 17/10
[52] U.S. Cl. ...................................... 226/3; 156/133; 156/405 R; 156/487; 156/543; 226/195; 226/196
[58] Field of Search ............... 156/123, 133, 394, 405, 156/487, 538, 543, 552; 226/3, 15, 16, 38, 39, 195-199, 97

[56] References Cited

U.S. PATENT DOCUMENTS

| | | | |
|---|---|---|---|
| 1,665,831 | 4/1928 | Williams | 156/405 |
| 2,592,581 | 4/1952 | Lorig | 226/3 |
| 2,660,218 | 11/1953 | Johnson et al. | 226/195 |
| 2,667,052 | 1/1954 | Lebocey | 226/195 |
| 3,038,524 | 6/1962 | Bosomworth | 156/405 |
| 3,170,829 | 2/1965 | Batten | 156/405 |
| 3,393,112 | 7/1968 | Brown | 156/405 |
| 3,413,174 | 11/1968 | Porter | 156/405 |
| 3,494,525 | 2/1970 | Wig | 226/196 |
| 3,863,858 | 2/1975 | Cauffiel et al. | 226/195 |
| 3,989,565 | 11/1976 | Appleby et al. | 156/405 |

*Primary Examiner*—David Klein
*Assistant Examiner*—John E. Kittle
*Attorney, Agent, or Firm*—R. S. Washburn

[57] ABSTRACT

Guiding of narrow strip components of yieldable material is accomplished by applying a gentle drag to the strip which is greater near its edge more distant from the guide line or plane than in the strip closer to such guide line or plane. The drag is applied by positioning soft bristle brushes in an apparatus in a guide frame one sidewall of which provides the guide plane while the strip is continuously supported on a floor plate perpendicular to the plane. The strip can be supported by an air film introduced between the strip and the floor of the guide frame. A simple mechanism for swinging the brushes into and out of operating position is also disclosed. The foregoing abstract is not to be taken as limiting the invention of this application, and in order to understand the full nature and extent of the technical disclosure of this application, reference must be made to the accompanying drawing and the following detailed description.

10 Claims, 4 Drawing Figures

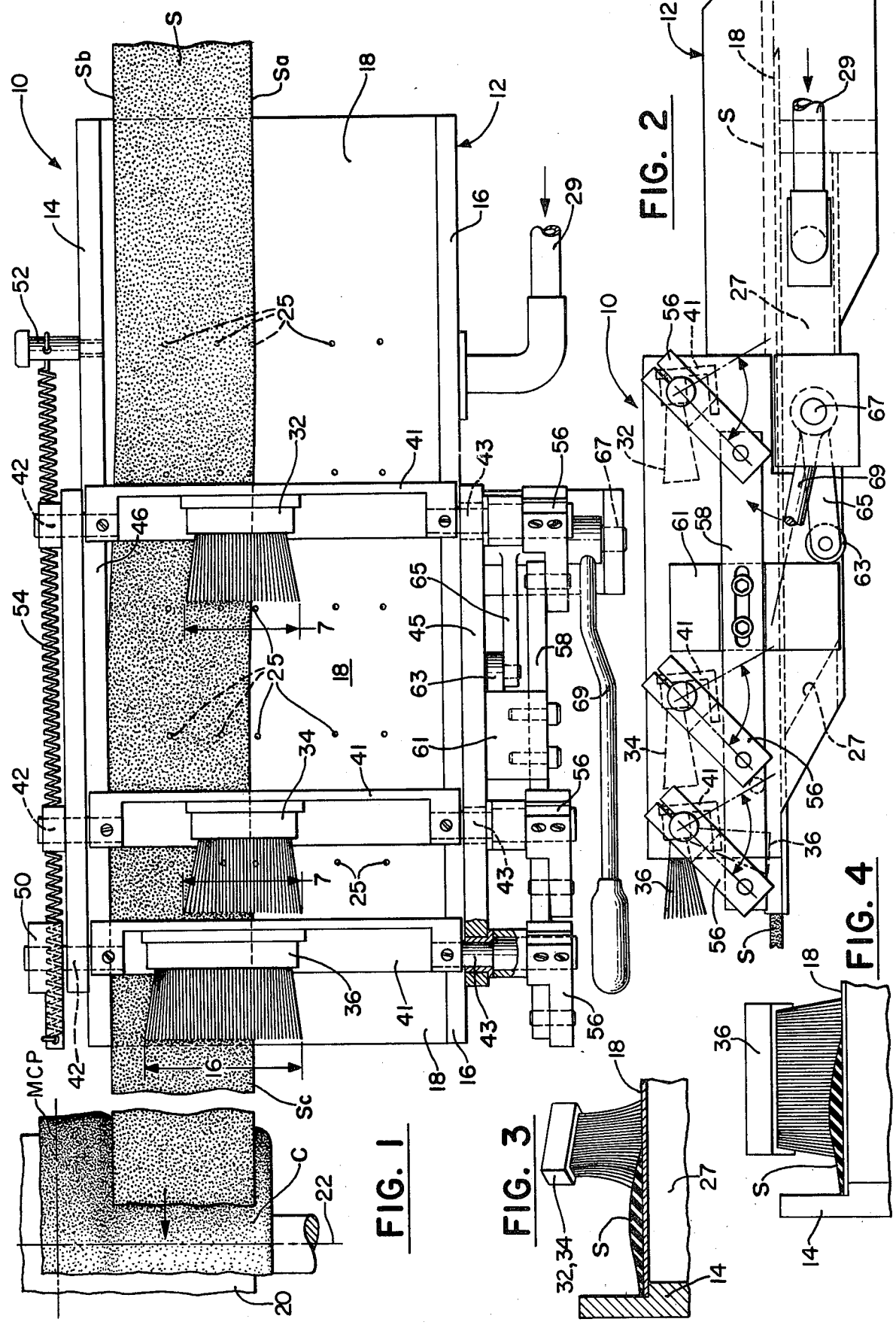

GUIDING NARROW STRIP

The present invention relates to guiding a running length strip with respect to a reference plane while moving the strip lengthwise. More particularly, the invention relates to the control of narrow strip components of yieldable material while such components are being applied to a carcass being constructed in a tire building machine. The invention aims to provide improved guiding of narrow strips with respect to a reference plane which reference plane can be located in appropriate relation to a tire building machine.

Briefly, the invention comprises a method of guiding a running length strip with respect to a reference plane which comprises pulling the strip forward in a direction parallel to said reference plane, applying to the strip a drag opposing forward movement which drag is greater near the running edge of the strip more distant from the reference plane than in the strip closer to that plane.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the drawings

FIG. 1 is a plan view of an apparatus for carrying out the method according to the invention;

FIG. 2 is an elevation view of the apparatus of FIG. 1;

FIGS. 3 and 4 are partial detail views illustrating features of the apparatus of FIG. 1.

The strip S with which the present invention is concerned is of elastically yieldable material such as natural, man-made rubber, rubbery materials useful in constructing tires. Typically, it is an extruded strip of rubbery material intended to form the sidewall portion of a completed tire.

It is well known that strips of materials destined to become parts of a vehicle tire are easily distorted and that such distortion contributes to impairment of quality in a finished tire. It is likewise known that the edges of such component strips, commonly being thin relative to the remainder of the strip, are so yieldable that accurate guiding with respect to said edges is often less than satisfactory as a means of guidance for the whole strip.

Contrary to the teaching and practices in the prior art, the present invention enables a limited degree of distortion or stretching of the component strip and satisfactorily guides the strip with respect to one of its edges which is gently urged into contact and alignment with the reference plane defined by a fence or sidewall of the apparatus about to be described.

A presently preferred embodiment of the apparatus is illustrated in FIG. 1. The apparatus 10 comprises a frame 12 including a pair of spaced apart, parallel sidewalls 14, 16 and a floor 18 extending perpendicularly of and between the sidewalls. The sidewall surface 14a defines a reference plane to which the strip S is guided. The apparatus is located with this reference plane parallel to the mid-circumferential plane MCP of a tire building machine 20 with which the apparatus 10 is associated. The distance, parallel to the axis 22 of the tire building machine, between the reference plane 14a of the apparatus and the mid-circumferential plane of the tire building machine can be adjusted suitably in any convenient manner. It should be noted also that in the particular apparatus 10 that the sidewalls of the frame are both perpendicular to the plane supporting surface or floor and that when convenient the surface of the other sidewall 16 can be employed as the reference plane and guide surface.

The floor 18 or plane supporting surface is formed of perforated plate providing air orifices 25 in regular array. The orifices open to a chamber 27 formed in the apparatus beneath the floor 18 and which has means 29 connectable to an air supply so that a film of air under slight pressure can be introduced between the floor and the moving strip. This air film serves to reduce the resistance of the strip to displacement both laterally and longitudinally in the apparatus and thus make the strip more responsive to the influence of the brush means about to be described.

To provide drag which is greater near the edge Sa of the strip S more distant from the reference plane than in the strip closer to the reference plane, the apparatus 10 employs a plurality of brushes 32, 34, and 36. The operational positions of the brushes are illustrated in FIGS. 3 and 4. Brushes 32 and 34, as seen in FIG. 3, apply a gentle drag on the surface of the strip as the latter is drawn or pulled parallel to the guide fence or wall 14 and reference plane as by the rotation of the tire building drum 20 to which the strip is being delivered. The brushes 32 and 34 gently engage the surface portion of the strip spaced away from the guide wall. The drag applied by the brushes 32 or 34 to the strip tends slightly to elongate a portion of the strip more distant from the wall 14 to a greater extent than the portion of the strip closer to the wall which is not under drag contact by the brush or brushes. Surprisingly, it is found that this slight drag can gently displace the strip toward the wall, yet without sufficient force to distort the edge Sb of the strip by its contact with the wall. It will be observed by comparing FIG. 3 with FIG. 4 that the brush 36 is considerably wider than the brushes 32 and 34. This latter brush 36, while contributing to the guidance of the strip, is useful also in providing a very slight tension in the strip extending between the apparatus 10 and the tire carcass C on the drum.

Each of the brushes is mounted on a brush mounting member 41 which is provided with journals 42, 43 respectively accommodated rotatably in side plates 45, 46 forming a part of the respective walls 16, 14 so that the brushes can be rotated downwardly into drag-inducing relation with the strip and alternatively rotated upward away from the strip to facilitate introduction of a fresh strip.

Brushes 32 and 34 each comprise a pair of rows of bristle bundles which rows are spaced about 10 millimeters apart and which bundles are spaced about 8 millimeters apart in each of the parallel rows. The bristle bundles themselves comprise about 60 fibers of 0.7 millimeters in diameter and approximately 30 millimeters in length. The bundles are fixed in a suitable hard backing, for example, a wooden block, which block is attached by conventional fasteners to the brush mounting member. The mounting member 41 is provided with suitable slots to allow adjustment of the brush position laterally of the apparatus. The brushes 32 and 34 have about 7 bristle bundles in each row, the brush 36 contains 16 bristle bundles in each row. It will be apparent that the brushes described can be varied extensively and so long as the requirement of applying a gentle drag to the forward moving strip which is greater in that part of the strip more distant from the guide wall than in the strip closer to the guide wall, numerous equivalents for the brushes described will be readily apparent.

Preferably, the brushes are biased toward drag relation with the strip by biasing means rather than being fixedly located in the dragging relation. Biasing means in the present apparatus is provided by a spring arm 50, a spring anchor 52 and a tension spring 54 connected between the spring arm and the anchor. The anchor is fixed in the sidewall 14 of the frame while the spring arm 50 is corotatably affixed to the journal 42 of one of the brush mounting members 41 which journal extends through the plate 46.

The journals 43 of the brush mounting members, which extend through the other plate 45 each have a crank 56 corotatably secured thereon. In order to move the brush means upward and out of contact with the strip, a link bar 58 is connected pivotally to the respective ends of the cranks such that each crank and the associated brush mounting member are rotated in timed relation between the operating position and the open or release position. The link bar and crank arrangements also serve to apply the bias of the tension spring 54 to each of the brush mounting members.

To move the brush means upward away from the floor 18 of the apparatus, a locking mechanism is provided. The mechanism includes a cam block 61 which is adjustably secured to the link bar 58. A roller 63 which is rollably engageable with the cam block is mounted at the free end of an arm 65, the other end of which is carried on a shaft 67 rotatably mounted in the frame. An operating lever 69 is corotatable with the arm 65 such that movement of the operating lever clockwise, as viewed in FIG. 2, moves the roller upward along the cam block as the latter is moved by the biasing means toward the right. This movement rotates the brush means downward into operating relation with the strip. Counter-clockwise movement of the lever 69 moves the roller 63 downward along the cam block 61, moving the latter together with the link bar toward the left, rotating the cranks 56 clockwise, thereby moving the brush means out of engagement with the strip. It will be observed that in the position shown in FIG. 2 the brush means are locked by the arm and cam block holding the brush means in inactive position. Other means for rocking the brushes into and out of their operating position may be readily employed.

Operation of the guide apparatus 10 will have become readily apparent to persons skilled in the art from the foregoing description. The apparatus having been disposed in appropriate relation with a tire building machine such that the wall 14 and reference plane is parallel to the mid-circumferential plane of the building drum, the operating lever is moved anti-clockwise to the position indicated in FIG. 2 such that the brushes are disposed upwardly away from the floor. Air flow communication is established between supply means and the chamber such that a small flow of air from each of the orifices in the plate is established. A strip, for example, of tire sidewall material, is then introduced into the apparatus so that its leading end Sc protrudes slightly beyond the end of the supporting floor adjacent the tire drum and with the edge Sb of the strip which is to be guided by the wall 14 gently positioned against the wall. The air flow between the strip and the floor tends to float and strip sufficiently so that its movement into a desired position is readily accomplished. The operating lever is then rotated clockwise releasing the brush means to the control of the biasing means and into engagement with the strip. The leading edge of the strip is then applied at the appropriate time to a carcass C being built on the drum and, with the rotation of the drum, is drawn forward. As the strip is pulled forward, the brushes exert a gentle drag on the strip sufficient to hold the strip against the guide wall 14 without distorting the edge of the strip and to move the strip to the guide wall to correct deviations in its path as the strip travels forward. Because of the air film between the strip and the floor, the brush 36 is additionally useful in preventing over-travel of the strip in the direction of the drum when rotation of the drum is halted.

While certain representative embodiments and details have been shown for the purpose of illustrating the invention, it will be apparent to those skilled in the art that various changes and modifications may be made therein without departing from the spirit or scope of the invention.

What is claimed is:

1. A method of guiding a running length strip of elastically yieldable tire building material with respect to a reference plane, comprising pulling the strip forward in a direction parallel to said reference plane, applying to the strip a drag opposing forward movement greater near the running edge thereof more distant from said plane than in the strip closer to said plane by and between a stationary plane supporting surface and resiliently fixed brush means engageable in drag-inducing relation with said strip; said drag being less than sufficient to strain said more distant edge beyond its elastically recoverable strain limit, and sufficient to cause said strip to deflect toward said reference plane.

2. A method as claimed in claim 1 further comprising reducing the drag applied by said plane surface to said strip by providing an air film on said surface and on the strip moving thereon.

3. Apparatus for guiding a running length strip of elastically yieldable tire building material with respect to a reference plane comprising a frame including a wall, said wall defining said reference plane, and a floor extending perpendicularly of said wall and defining a stationary plane strip supporting surface; at least one brush mounting member extending from and supported by the sidewall; and stationary brush means affixed to the or each mounting member to extend toward said floor in drag-inducing relation with said strip thereon and located outwardly of said one wall to apply such drag to said strip greater near the edge more remote from said plane than in the edge closer to said plane.

4. Apparatus as claimed in claim 3, said frame having a chamber, said floor having a multiplicity of orifices in spaced array opening from said chamber to said plane surface for introducing air from said chamber to the region of mutual contact between said strip and said plane supporting and stationary surface to reduce the drag on said strip exerted by said surface.

5. Apparatus as claimed in claim 3, said brush means comprising a brush having a multiplicity of fibers yieldably engageable with said strip.

6. Apparatus as claimed in claim 3, said brush means comprising a pair of rows spaced ten millimeters apart of bristle bundles spaced eight millimeters apart in each of said rows, the bundles having 60 fibers of 0.7 millimeters in diameter and 30 millimeters in length.

7. Apparatus as claimed in claim 3, the or each brush mounting member being supported for rotation about its own length, and biasing means connected to the or each member to urge rotation thereof to swing said brush means downward toward said floor.

8. Apparatus as claimed in claim 7, further comprising rocking means connected to the or each brush mounting member for selectably swinging said brush means toward and away from said floor.

9. Apparatus as claimed in claim 8, said biasing means comprising a spring arm fixed corotatably on said at least one brush mounting member, a spring anchor fixed on one of said sidewalls, and a tension spring connected between said arm and said anchor to bias rotation of the or each brush mounting member.

10. Apparatus as claimed in claim 9, said rocking means comprising a crank corotatably secured to the or each brush mounting member, a link bar pivotally connected to the or each crank, a cam block affixed to the link bar, an operating lever and a roller rollably engageable with the block, the lever being movable to urge the roller to move the block to a locked open position holding said brush means in inactive position.

* * * * *